US006765304B2

(12) United States Patent
Baten et al.

(10) Patent No.: US 6,765,304 B2
(45) Date of Patent: Jul. 20, 2004

(54) MOBILE POWER GENERATION UNIT

(75) Inventors: Robert Allen Baten, Baytown, TX (US); Kenneth Robert Austin, Pearland, TX (US)

(73) Assignee: General Electric Co., Schenectady, NY (US)

(*) Notice: Subject to any disclaimer, the term of this patent is extended or adjusted under 35 U.S.C. 154(b) by 103 days.

(21) Appl. No.: 09/682,609

(22) Filed: Sep. 26, 2001

(65) Prior Publication Data

US 2003/0057704 A1 Mar. 27, 2003

(51) Int. Cl.[7] .......................... F02B 65/00; H02P 9/04; H02B 5/04; F01D 15/10; F01K 23/10

(52) U.S. Cl. .............................. 290/1 A; 290/2; 60/618

(58) Field of Search .......................... 60/597, 614, 616, 60/618; 290/1 A, 2, 1 R

(56) References Cited

U.S. PATENT DOCUMENTS 1,380,123 A * 5/1921 Sullivan ..................... 290/1 A
2,575,242 A * 11/1951 Allen ........................ 105/61.5
2,591,848 A * 4/1952 McClean ..................... 105/35
2,789,234 A * 4/1957 Lambert et al. ............ 290/1 R
2,961,549 A * 11/1960 Shipitalo .................... 290/1 A
3,116,086 A * 12/1963 Barengoltz .................. 296/181
3,453,443 A * 7/1969 Stoeckly ........................ 290/2
3,536,928 A * 10/1970 Jones, Jr. et al. ........... 290/1 B
3,602,730 A * 8/1971 Cushing ..................... 370/150
3,791,682 A * 2/1974 Mitchell ........................ 290/2
3,805,082 A * 4/1974 Murray ....................... 290/1 R
3,906,686 A * 9/1975 Dillon ........................ 52/79.9
4,117,342 A * 9/1978 Melley, Jr. .................. 290/1 A
4,136,432 A * 1/1979 Melley, Jr. .................... 29/469
4,469,954 A * 9/1984 Maehara ..................... 290/1 A
4,961,403 A * 10/1990 Kawaguchi et al. ........... 123/2
4,992,669 A 2/1991 Parmley ..................... 290/1 R
5,150,568 A * 9/1992 White ......................... 60/797
5,517,822 A 5/1996 Haws et al. .................. 60/618
5,960,637 A * 10/1999 Stevens et al. ................ 62/77
6,009,802 A * 1/2000 Schaaf et al. ................. 100/39
6,393,775 B1 * 5/2002 Staschik ..................... 52/79.1
6,532,398 B2 * 3/2003 Matsumoto ................. 700/213
6,688,048 B2 * 2/2004 Staschik ..................... 52/79.1

* cited by examiner

*Primary Examiner*—Nicholas Ponomarenko
*Assistant Examiner*—Pedro J. Cuevas
(74) *Attorney, Agent, or Firm*—Hunton & Williams LLP

(57) ABSTRACT

A mobile power generation system is provided. The system includes a main trailer having an engine and an electric generator turned by the engine, an air filtration trailer having air filtration equipment for filtering air used as inlet air to the engine, an exhaust trailer having a part of an exhaust silencing system for reducing engine output noise, and an auxiliary trailer having auxiliary equipment for use during operation of the engine.

29 Claims, 3 Drawing Sheets

MOBILE POWER GENERATION UNIT

BACKGROUND OF THE INVENTION

Embodiments of the invention relate to multi-part mobile equipment. More particularly, embodiments of the invention relate to multi-part mobile electric power generation equipment.

There is often a need for electric power generation in locations where permanent power is not available such as, for example, disaster sites or hospitals which have lost all other sources of power.

SUMMARY OF THE INVENTION

The invention provides, among other things, solutions to problems associated with providing power to remote or emergency areas.

Examples of the invention include a mobile power generation system. The system includes a main trailer having an engine and an electric generator turned by the engine, an air filtration trailer having air filtration equipment for filtering air used as inlet air to the engine, an exhaust trailer having a part of an exhaust silencing system for reducing engine output noise, and an auxiliary trailer having auxiliary equipment for use during operation of the engine.

Examples of the invention include a main trailer for use with a plurality of other trailers. The main trailer being capable of connecting to the other trailers to form a power generation system. The main trailer includes a gas turbine, an electric generator turned by the gas turbine, a generator lineside cubicle, and switchgear. The switchgear is hard-wired to the generator lineside cubicle.

Examples of the invention include a method of providing a mobile power generation system. The method includes providing a main trailer having an engine and an electric generator turned by the engine, providing an air filtration trailer having air filtration equipment for filtering air used as inlet air to the engine, providing an exhaust trailer having a part of an exhaust silencing system for reducing engine output noise, and providing an auxiliary trailer having auxiliary equipment for use during operation of the engine. The method also includes attaching the air filtration trailer to the main trailer, attaching the exhaust trailer to the main trailer, and attaching the auxiliary trailer to the main trailer.

These and other features of the invention will be readily apparent to those skilled in the art upon reading this disclosure in connection with the attached drawing figures.

DETAILED DESCRIPTION OF THE INVENTION

The invention provides a solution to the problem of providing large amounts of electrical power to locations where permanent electrical power is not currently available. Embodiments of the invention solve this problem by providing a complete mobile electric power generation system mounted on a plurality of trailers that can be moved over highways and other roads.

Figure 1:
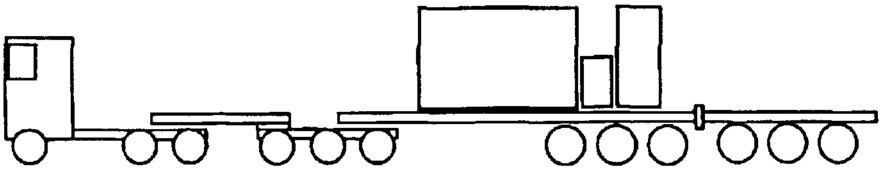
FIG. 1 is a side view of an example of a trailer in accordance with the invention attached to a tractor for transport.

FIG. 1 is a side view of an example of a trailer in accordance with the invention attached to a tractor for transport. FIGS. 2–5 are schematic views of examples of trailers in accordance with the invention. In the example shown in FIGS. 2–5, the components of the mobile electric power generation system are mounted on four trailers.

Figure 2:
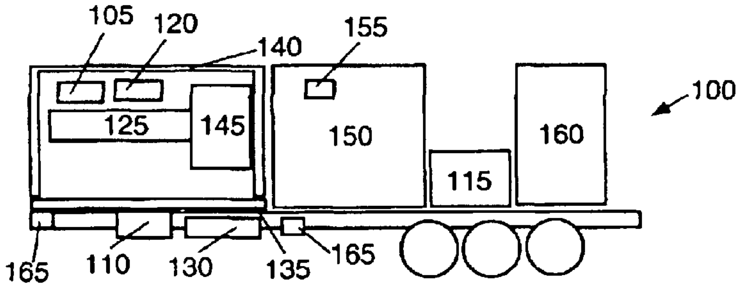
FIG. 2 is a side schematic view of an example of a main trailer in accordance with the invention.

FIG. 2 shows an example of a main trailer 100 on which a gas turbine and mounting system 125 and a complete generator with lineside and neutral cubicles are mounted. It is preferable that the gas turbine 125 and complete generator with lineside and neutral cubicles 150 are mounted on the same trailer so as to avoid the extensive time and effort that would be required to align a turbine and a generator transported on separate trailers. In FIG. 2, gas turbine 125 is mounted on a turbine base 135. In this example, turbine base 135 has a three-point mounting system using devises and isolators and lift rings. A drop over turbine enclosure 140 with lift rings is provided to protect gas turbine 125 and to help contain noise generated by gas turbine 125. Also included in this example of main trailer 100 are turbine enclosure fire protection components 105 such as horns, beacons, nozzles and detectors; a complete turbine lube oil system 110, in this example less an oil cooler; a complete generator lube oil system 115, in this example less an oil cooler; and turbine generator vibration monitoring equipment 120. Also provided in this example are a main turbine terminal box 130; a main generator terminal box 155 and switch gear 160 that is hard wired to the line side cubicle of generator 150. An exhaust collector 145 with drain system, blanket and mounting system is provided along with a female half 165 of an exhaust trailer/main trailer docking station and a filter trailer/main trailer docking station.

Figure 3:
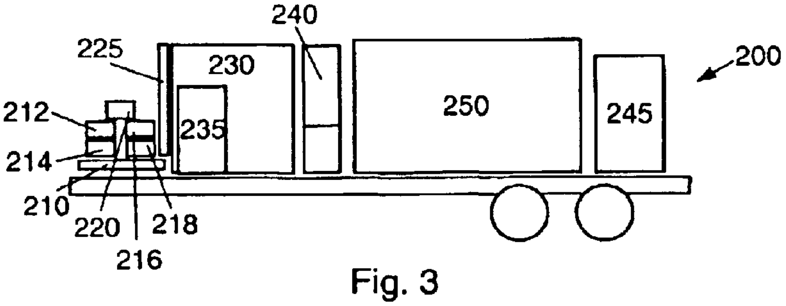
FIG. 3 is a side schematic view of an example of an auxiliary trailer in accordance with the invention.

FIG. 3 shows an example of an auxiliary trailer 200 on which an auxiliary skid 210 is mounted. Auxiliary skid 210 contains hydraulic start components 212 used to start gas turbine 125, off-line water wash components 214, gas fuel components 216, liquid fuel components 218, and water injection components 220. Gas vents and interconnect hoses 225, oil coolers and interconnects 230, and fire system bottles and interconnects 235 are also provided. A rail-mounted turbine ventilation silencer 240 is transported on auxiliary trailer 200 but is moved and bolted to turbine enclosure 140 at the power generation location. A generator outlet silencer 245 is mounted on auxiliary trailer 200 for transport only and is connected to generator 150 at the power generation location. A control house 250 is provided to house the controls necessary for operation of the system and includes air conditioning, lighting, an uninterrupted power supply system, a motor control center, a transformer, a turbine control panel, a variable frequency drive (VFD) system for the liquid fuel and water injection systems, a desktop computer, a 24-volt DC control system and fire system battery system and charger, and a 125-volt DC switch gear and backup generator lube oil pump motor battery system and charger.

Figure 4:
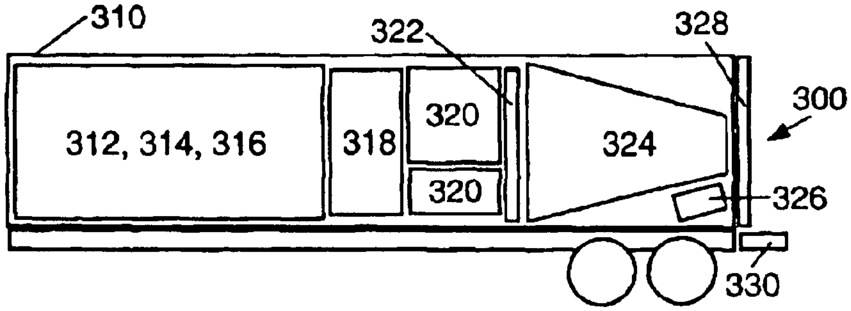
FIG. 4 is a side schematic view of an example of an inlet trailer in accordance with the invention.

FIG. 4 shows an example of an inlet trailer 300 in accordance with the invention. On inlet trailer 300 is mounted a filter house that houses air filtration equipment. The air filtration equipment includes marine type separators 312 before and after the filtration system, filtration 314 for both combustion and ventilation air, a heating/chilling coil 316 placed in line between combustion filter stages, and turning vanes 318. Also included in filter house 310 are combustion and ventilation air silencers 320, foreign object damage (FOD) screen and commissioning screen 322, an inlet plenum 324 with turbine bell mouth transition and flex connection, direct drive ventilation fans 326 with back draft dampers, and a flexible connection 328 for a filter house/turbine enclosure interface. A male half 330 of the filter trailer/main trailer docking station is also included.

Figure 5:
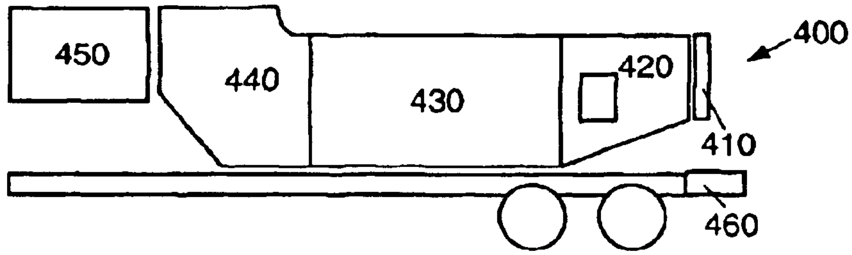
FIG. 5 is a side schematic view of an example of an exhaust trailer in accordance with the invention.

FIG. 5 shows an example of an exhaust trailer 400 on which certain exhaust components are mounted. An exhaust collector flange flex connection 410, a transition duct 420 with maintenance access door, a horizontal silencer section 430 with drains and a 90 degree exhaust elbow 440 with drain are provided. In addition a vertical stack 450 that, in this example, is rotated down for transport and then rotated up at the power generation site, is also provided. Also a male half 460 of the exhaust trailer/main trailer docking station is mounted on exhaust trailer 400.

While FIGS. 2–5 show, as examples, particular elements of a mobile power generation system in accordance with the invention, it is noted that some elements shown on a particular trailer may be included, instead, on another one of the trailers or, in some cases, may be omitted. Further, other equipment (not shown) can be added to any of the trailers. In deciding which elements of the system are included on each of the trailers, highway regulations regarding weight and size are considered in order to minimize or eliminate the need for special transportation permits. By reducing or, preferably, eliminating the need for such permits, the overall time required for deployment of the system can be reduced.

By providing height adjustments, preferably using the trailer's air suspension, alignment of the trailers and set up can be facilitated. In addition, by providing quick disconnect connectors on all cables and hoses throughout the system, assembly of the system at the power generation location can be accomplished more quickly and easily.

Figure 6:
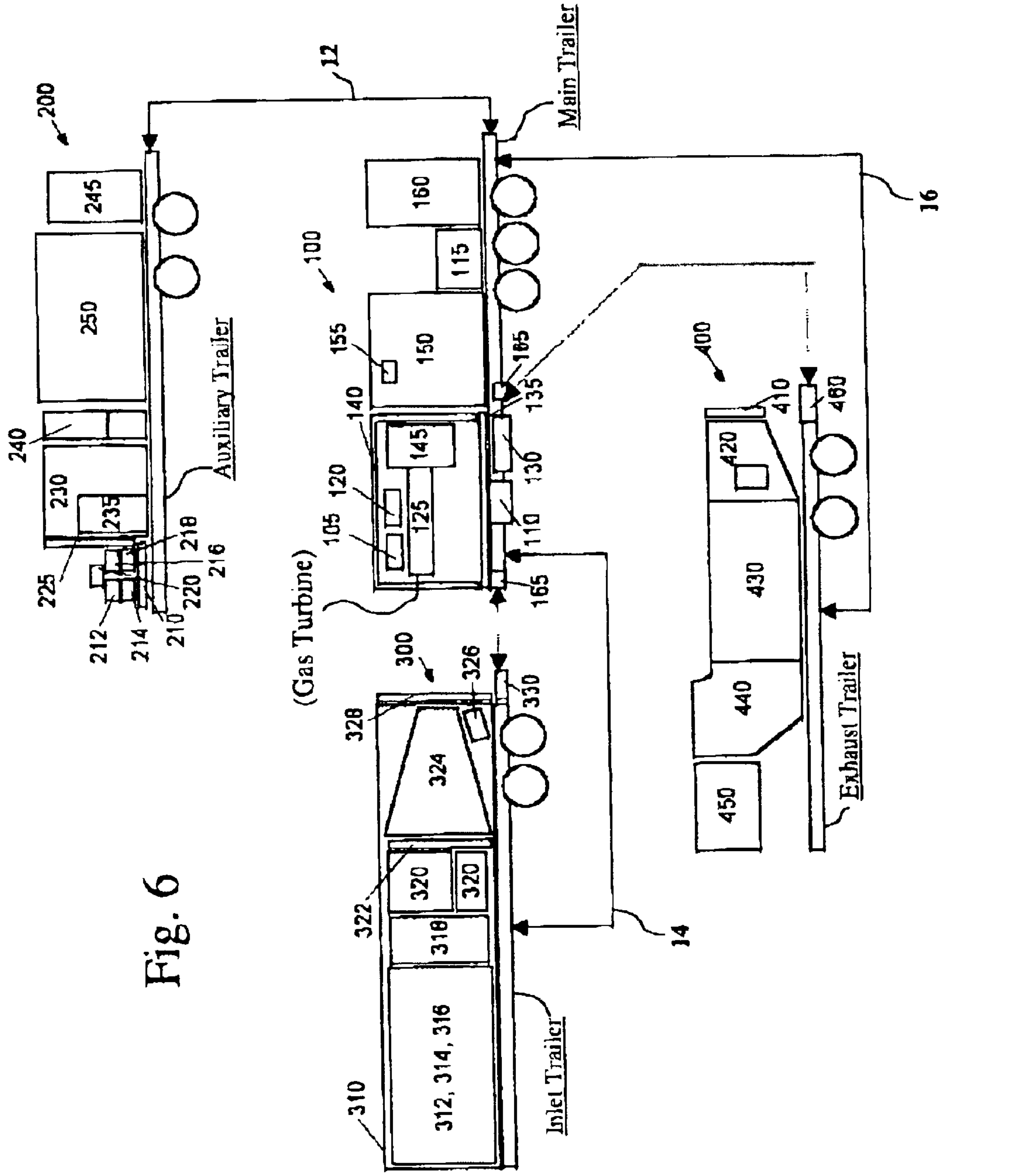
FIG. 6 is a side schematic view of the trailers of FIGS. 2, 3, 4 and 5 in an assembled state in accordance with the invention.

In accordance with further aspects of the invention, FIG. 6 is a side schematic view of the trailers of FIGS. 2, 3, 4 and 5 in an assembled state. Specifically, FIG. 6 shows the main trailer 100, the auxiliary trailer 200, the inlet trailer 300 and the exhaust trailer 400. The main trailer 100 includes a gas turbine 125, as shown. As described above, the invention provides for attaching the air filtration trailer to the main trailer, attaching the exhaust trailer to the main trailer, and attaching the auxiliary trailer to the main trailer. Attachments (12, 14 and 16) between the trailers are shown in FIG. 6, i.e., the attachments (12, 14 and 16) schematically show that components on the attached trailers may be connected. As described above, for example, by providing quick disconnect connectors on all cables and hoses throughout the system, assembly of the system at the power generation location can be accomplished more quickly and easily. In accordance with further aspects, as described above, on the main trailer 100, provided is a female half 165 of an exhaust trailer/main trailer docking station and a filter trailer/main trailer docking station. On the inlet trailer 300, a male half 330 of the filter trailer/main trailer docking station is also included. Also a male half 460 of the exhaust trailer/main trailer docking station is mounted on exhaust trailer 400.

While the invention has been described with reference to particular embodiments and examples, those skilled in the art will appreciate that various modifications may be made thereto without significantly departing from the spirit and scope of the invention.

What is claimed is:

1. A mobile power generation system, comprising:

a main trailer having an engine, wherein the engine is a gas turbine; and an electric generator turned by the engine;

an air filtration trailer having air filtration equipment for filtering air used as inlet air to the engine;

an exhaust trailer having a part of an exhaust silencing system for reducing engine output noise; and an auxiliary trailer having auxiliary equipment for use during operation of the engine.

2. The system of claim 1, wherein the auxiliary equipment comprises one of engine start components, fuel components, fire system bottles, and a control house.

3. The system of claim 1, wherein the main trailer further comprises switchgear electrically connected to the electric generator.

4. The system of claim 3, wherein the switchgear is ultimately hardwired to the generator.

5. The system of claim 4, wherein the main trailer further comprises a generator lineside cubicle, and the switchgear is hardwired to the generator lineside cubicle.

6. The system of claim 5, wherein the main trailer further comprises a turbine lube oil system; and a generator lube oil system.

7. The system of claim 6, wherein the main trailer further comprises an exhaust collector, the exhaust collector comprising a drain system.

8. The system of claim 1, wherein the air filtration trailer further comprises one of a male half and a female half a filter trailer/main trailer docking station.

9. The system of claim 8, wherein the main trailer further comprises the other of the male half and the female half of the filter trailer/main trailer docking station.

10. The system of claim 1, wherein the air filtration trailer further comprises a filter house, the filter house having a drain, filters for combustion air, filters for ventilation air, combustion air silencers, and ventilation air silencers.

11. The system of claim 1, wherein the exhaust trailer further comprises one of a male half and a female half of an exhaust trailer/main trailer docking station.

12. The system of claim 11, wherein the main trailer further comprises the other of the male half and the female half of the exhaust trailer/main trailer docking station.

13. The system of claim 1, wherein the exhaust trailer further comprises a vertical exhaust stack, the vertical exhaust stack being reversibly rotatable from a down position to an up position, the down position being for transport, and the up position being for use.

14. A main trailer for use with a plurality of other trailers, the main trailer being capable of connecting to the other trailers to form a power generation system, the main trailer comprising:

a gas turbine;

an electric generator turned by the gas turbine;

a generator lineside cubicle; and switchgear, wherein the switchgear is hardwired to the generator lineside cubicle; and wherein the other trailers comprise:

an air filtration trailer having air filtration equipment for filtering air used as inlet air to the gas turbine;

art exhaust trailer having a part of an exhaust silencing system for reducing engine output noise; and an auxiliary trailer having auxiliary equipment for use during operation of the engine.

15. The trailer of claim 14, further comprising an exhaust collector, the exhaust collector comprising a drain system.

16. The trailer of claim 15, further comprising one of a male half and a female half of a filter trailer/main trailer docking station.

17. A method of providing a mobile power generation system, comprising:

providing a main trailer having an engine, wherein the engine is a gas turbine, and an electric generator turned by the engine;

providing an air filtration trailer having air filtration equipment for filtering air used as inlet air to the engine;

providing an exhaust trailer having a part of an exhaust silencing system for reducing engine output noise; and providing an auxiliary trailer having auxiliary equipment for use during operation of the engine;

attaching the air filtration trailer to the main trailer;

attaching the exhaust trailer to the main trailer; and attaching the auxiliary trailer to the main trailer.

18. The method of claim 17, wherein the auxiliary equipment comprises one of engine start components, fuel components, lube oil cooler, fire system bottles, and a control house.

19. The method of claim 17, wherein the main trailer further comprises switchgear electrically connected to the electric generator.

20. The method of claim 19, wherein the switchgear is ultimately hardwired to the generator.

21. The method of claim 20, wherein the main trailer further comprises a generator lineside cubicle, and the switchgear is hardwired to the generator lineside cubicle.

22. The method of claim 21, wherein the main trailer further comprises a turbine lube oil system; and a generator lube oil system.

23. The method of claim 22, wherein the main trailer further comprises an exhaust collector, the exhaust collector comprising a drain system.

24. The method of claim 17, wherein the air filtration trailer further comprises one of a male half and a female half of a filter trailer/main trailer docking station.

25. The method of claim 24, wherein the main trailer further comprises the other of the male half and the female half of the filter trailer/main trailer docking station.

26. The method of claim 17, wherein the air filtration trailer further comprises a filter house, the filter house having a drain, filters for combustion an, filters for ventilation air, combustion air silencers, and ventilation air silencers.

27. The method of claim 17, wherein the exhaust trailer further comprises one of a male half and a female half of an exhaust trailer/main trailer docking station.

28. The method of claim 27, wherein the main trailer further comprises the other of the male half and the female half of the exhaust trailer/main trailer docking station.

29. The method of claim 17, wherein the exhaust trailer further comprises a vertical exhaust stack, the vertical exhaust stack being reversibly rotatable from a down position to an up position, the down position being for transport, and the up position being for use.

* * * * *